United States Patent [19]

Yoshimoto et al.

[11] Patent Number: 5,212,140

[45] Date of Patent: May 18, 1993

[54] CATALYST FOR DECOMPOSING OZONE

[75] Inventors: Masafumi Yoshimoto, Sakai; Tadao Nakatsuji, Kitakatsuragi; Kazuhiko Nagano; Kimihiko Yoshida, both of Sakai, all of Japan

[73] Assignee: Sakai Chemical Industry Co., Inc., Sakai, Japan

[21] Appl. No.: 747,062

[22] Filed: Aug. 19, 1991

[30] Foreign Application Priority Data

Feb. 28, 1991 [JP] Japan .................................. 3-120655
May 7, 1991 [JP] Japan .................................. 3-198971

[51] Int. Cl.$^5$ ...................... B01J 35/04; B01J 35/12; B01J 32/00; C01B 13/00
[52] U.S. Cl. ............................... 502/300; 502/439; 502/527; 502/324; 502/345; 502/347; 502/325; 502/330; 502/331; 423/219
[58] Field of Search ............... 502/439, 527, 324, 345, 502/347, 325, 330, 331, 300; 423/219

[56] References Cited

U.S. PATENT DOCUMENTS

| | | | |
|---|---|---|---|
| 4,206,083 | 6/1980 | Chang | 423/219 X |
| 4,343,776 | 8/1982 | Carr et al. | 423/219 X |
| 4,366,085 | 12/1982 | Ikegami et al. | 423/219 X |
| 4,416,800 | 11/1983 | Abe et al. | 502/527 X |
| 4,871,709 | 10/1989 | Tatsushima et al. | 502/324 |
| 5,002,920 | 3/1991 | Yoshimoto et al. | 502/324 |
| 5,070,064 | 12/1991 | Hsu et al. | 502/325 |
| 5,145,657 | 9/1992 | Kobayashi et al. | 423/219 |

FOREIGN PATENT DOCUMENTS

| | | | |
|---|---|---|---|
| 0367574 | 5/1990 | European Pat. Off. | 502/324 |
| 0371740 | 6/1990 | European Pat. Off. | 502/324 |

OTHER PUBLICATIONS

Patent abstract of Japan, vol. 7, No. 91 (C-162)(1236) Apr. 15, 1983.
Patent abstract of Japan, vol. 7, No. 131 (C-169) (1276) Jun. 8, 1983.

Primary Examiner—W. J. Shine
Assistant Examiner—Douglas J. McGinty
Attorney, Agent, or Firm—Nikaido, Marmelstein, Murray & Oram

[57] ABSTRACT

A catalyst for decomposing ozone comprising a carrier and a catalytic active substance having ozone resolvability carried thereon in a thickness of 10 to 200 μm. Consequently, ozone can efficiently be removed. The invention also includes the catalytic active substance or ozone adsorption substance which is contained in the carrier, such that the combination of the carrier and its contained material has ozone resolvability or ozone adsorbing ability in itself. Accordingly, the combination of these two features allows the thickness of the catalytic active substance carried on a carrier surface to be reduced to the range from 5 to 100 μm. Thus, improved productivity, durability of the catalyst and ozone removing efficiency are provided.

4 Claims, 1 Drawing Sheet

CATALYST FOR DECOMPOSING OZONE

BACKGROUND OF THE INVENTION

The present invention relates to a catalyst for decomposing and removing ozone contained in gas or the like.

Examples of a conventional method for removing the harmful ozone contained in the gas, include (i) an adsorbing method using a porous substance such as a catalytic active substance or ozone adsorption substance, zeolite or the like and (ii) an oxidizing and decomposing method using a catalyst such as $MnO_2$.

However, none of the conventional decomposing methods above mentioned fully achieve a satisfactory decomposition. More specifically, in the adsorbing method, the adsorbent needs to be regenerated or exchanged since its adsorbing ability expires in a limited period of time. This presents the problem that a removing apparatus requires much labor and expense for maintenance.

The oxidizing and decomposing method using a catalyst includes no such problems as above mentioned, but does not fully achieve satisfactory decomposition in view of catalyst performance. In addition, the performance is initially good but deteriorates with the passage of time during reaction.

The present inventors have variously investigated the reaction for oxidizing and decomposing ozone. As a result, the following has been found. In other words, since the rate determining step of the reaction is the step of diffusion into the solid, the reaction proceeds only on the catalyst surface. Consequently, it is most preferable that the catalytic composition is of the coating-type in which catalytic active components are carried on the catalytic surface and in the vicinity thereof. However, in the case where a honeycomb construction is used for a carrier, cells of the honeycomb are easily plugged by the coated catalytic active components and the ease of plugging increases as the number of cells/inch$^2$ is increased. Consequently, there is caused the problem that a low-pitch honeycomb type catalyst for decomposing ozone, which has great number of cells/inch$^2$, is poor in productivity.

Accordingly, it is a main object of the present invention to provide a catalyst for decomposing ozone which is superior to the conventional catalyst in its ability to remove ozone by an oxidizing and decomposing method.

It is another object of the present invention to provide a catalyst for decomposing ozone which has good durability for a long time.

It is yet another object of the present invention to provide a catalyst for decomposing ozone having high productivity even if the carrier therefore is a low pitch honeycomb-type.

SUMMARY OF THE INVENTION

To achieve the objects above mentioned, the catalyst for decomposing ozone according to the present invention is a catalyst which carries its catalytic active substance, having ozone resolvability, at a thickness of 10 to 200 μm, on a carrier.

The coating thickness of the catalytic active substance should be 10 to 200 μm for the following reasons. More specifically, when ozone reaches an active point, the decomposition reaction velocity of ozone is extremely high, so that the rate determining step of the ozone decomposition reaction is in the diffusion of the ozone to a point of catalytic activity. Accordingly, there is effectively utilized a catalytic active substance which is carried on a carrier and is positioned in a place having a constant depth from a surface layer, i.e., in an effective zone. Consequently, even if the thickness of the catalytic active substance, which coats the carrier (hereinafter referred to as coating thickness), is made greater than that of the effective zone, the ozone decomposition reaction velocity will not be increased. In other words, even if an amount of the catalytic active substance which is used is increased so that the coating thickness is greater than that of the defined effective zone, the additional catalyst is not useful as mentioned above. The thickness of the effective zone varies according to the porosity of the catalytic active substance. When the porosity is increased, the effective zone is made thicker. As described above, the catalyst of the present invention can concentrate the catalytic active substance in the effective zone in proper quantities. Consequently, the ozone decomposition reaction velocity can be increased irrespective of the amount of the catalytic active substance per unit capacity.

If the coating thickness of the catalytic active substance is not greater than the above-mentioned range, the suitable ozone decomposition rate cannot be obtained. If the coating thickness exceeds the above-mentioned range, a correspondent increased decomposition rate will not be obtained, and pressure loss is made greater so that blast costs are increased, or cracks are generated in the coating layer so that the carried catalytic active substance is peeled from the carrier.

Another catalyst for decomposing ozone of the present invention comprises a carrier containing a catalytic active substance, having ozone resolvability or an ozone adsorption substance and a catalytic active substance which is the same as or different from the catalytic active substance having ozone resolvability and is carried on the carrier in a thickness of 5 to 100 μm.

More specifically, the catalytic active substance having ozone resolvability or the ozone adsorption substance is contained in the carrier so that the ozone resolvability or ozone adsorbing ability is imparted to the carrier itself. Thus, the thickness of the catalytic active substance which is carried on the carrier can be reduced. Accordingly, since the active component of the catalyst for decomposing ozone has a small coating thickness, it is excellent in the production of the low pitch honeycomb type catalyst. In addition, the catalyst for decomposing ozone according to the present invention has good durability and performance for a long time.

As described above, the catalyst for decomposing ozone according to the present invention has the effect that ozone can effectively be removed.

DETAILED DESCRIPTION OF THE INVENTION

Examples of the catalytic active substances to be used include at least one of metals such as Ti, Cu, Mn, Ni, Fe, Ag, Au Mo, Zr, Sn, Nb, W or the like, or metal oxides, metal sulfates thereof. Activated carbon or acid may be mixed with the metal, metal oxide or metal sulfate as mentioned above. Examples of metal oxide are $MnO_2$, $NiO$, $CuO$, $Fe_2O_3$, a binary-catalyst type such as $MnO_2$-$TiO_2$, $MnO_2$-$SiO_2$, $MnO_2$-$WO_3$, $MnO_2$-$V_2O_5$, $CuO$-$TiO_2$, $Co_3O_4$-$TiO_2$, $Fe_2O_3$-$TiO_2$, $Fe_2O_3$-$Au$, $MnO_2$-$Ag_2O$, $MnO_2$-$CuO$, $MnO_2$-$Fe_2O_3$, $NiO$-$Co_3O_4$, $NiO$-$TiO_2$, $NiO$-$MnO_2$, $NiO$-$MnO_2$, $NiO$-$Ag_2O$, $NiO$-$MoO_3$, $NiO$-$WO_3$, $NiO$-$SnO_2$ or the like, a ternary-catalyst type such as $MnO_2$-$Co_3O_4$-$TiO_2$, $MnO_2$-$Co_3O_4$-$Ag_2O$, $NiO$-$MnO_2$-$TiO_2$, $MnO_2$-$WO_3$-$TiO_2$, $MnO_2$-$MoO_3$-$TiO_2$, $MnO_2$-$V_2O_5$-$TiO_2$, $MnO_2$-$Ag_2O$-$TiO_2$, $MnO_2$-$CuO$-$Ag_2O$, $NiO$-$MnO_2$-$Ag_2O$, $NiO$-$MnO_2$-$TiO_2$ or the like, $MnO_2$- (alkali metal and/or alkali earth metal oxide), or a zeolite catalyst type, carrying metal, having an oxide formation enthalpy of 100 Kcal/g oxygen atom or less.

The catalytic active substance of the present invention is not limited to the foregoing. The most effective catalyst is a silver type such as $MnO_2$-$Ag_2O$, $MnO_2$-$Ag_2O$-$TiO_2$, $MnO_2$-$Ag_2O$-$TiO_2$-$SiO_2$, $MnO_2$-$Ag_2O$-$TiO_2$-$Al_2O_3$, $Ag_2O$-$TiO_2$, $Ag_2O$-$Al_2O_3$ or the like.

As a carrier for carrying the active substance, corrugated honeycomb made of ceramic fiber, cordierite honeycomb, or moldings having various shapes and made of clay or the like can be used. The carrier is not particularly limited in shape, but may be in any form such as honeycomb, pellet, cylinder, pipe or the like. The carrier containing the catalytic active substance or ozone adsorption substance can be produced mainly by a kneading method.

Figure 1:
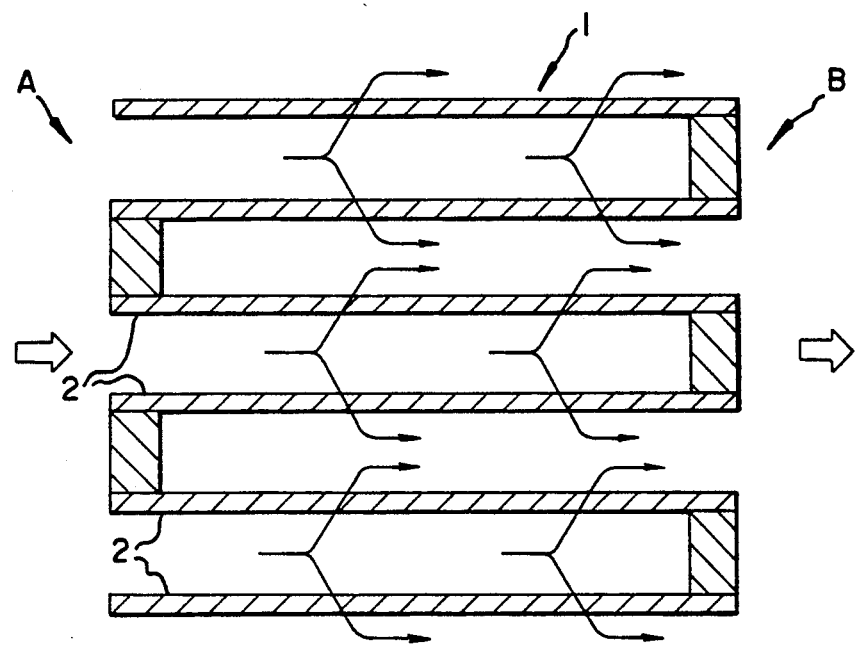
FIG. 1 is a section view of a honeycomb type catalyst.

The honeycomb type catalyst has a so-called catalytic filter constitution, for example, as shown in FIG. 1. The honeycomb type catalyst is formed by carrying the catalytic active substance on a honeycomb structure 1. The honeycomb structure 1 is made of ceramic in which openings of a gas inlet A and a gas outlet B are alternately blocked. Walls 2 of the honeycomb structure 1 are made of porous ceramic having permeability. Consequently, the gas introduced from the inlet A into the filter (as shown by an arrow) is forcibly passed through the walls 2 and is then discharged from the outlet B. The opening is not particularly limited in shape, but may be in any form such as hexagon, circle, quadrangle, triangle or the like.

There may be added (i) a forming assistant such that the carrier easily gets into shape, or (ii) a reinforcing agent such as inorganic fiber or an organic binder to improve the mechanical strength or the like.

The content of the catalytic active substance or ozone adsorption substance contained in the carrier is preferably in the range from 10 to 80% by weight, more preferably in the range from 20 to 50% by weight. If the content of the catalytic active substance or ozone adsorption substance is smaller than 10% by weight, the ozone resolvability or ozone adsorbing ability of the carrier is considerably lowered. Consequently, it would then be necessary to increase the coating thickness of the catalytic active substance in order to obtain high resolvability. Examples of the preferred catalytic active substance to be contained in the carrier are $MnO_2$, $NiO$, $CuO$, $Ag_2O$ and the like. Examples of the ozone adsorption substance having ozone adsorbing ability are activated carbon, zeolite and the like. Referring to the present invention, the catalytic active substance and ozone adsorption substance may be contained in the carrier separately or in mixture.

The catalytic active substance can be applied to the carrier by, for example, a wash coat method wherein a slurry of the catalytic active substance is adhered onto the surface of the carrier by dipping the carrier in the slurry and drying it out. The carrier containing the catalytic active substance or ozone adsorption substance carries the catalytic active substance at a coating thickness of 5 to 100 μm, preferably 10 to 50 μm. If the coating thickness is not greater than 5 μm, decomposing activity is lowered. If the coating thickness exceeds 100 μm, the decomposing activity is not improved but the pressure loss is increased.

The reaction temperature at the time of decomposing ozone is preferably in the range from 0° to 40° C. and more preferably in the range from 10° to 30° C. A temperature less than 0° C. causes the reaction velocity to be slower, while a temperature exceeding 40° C. requires the input of additional energy for increasing the temperature, resulting in poor economy.

Preferably, the catalyst comes in contact with the reaction gas in a range of area velocity (AV) from 5 to 70. An area velocity less than 5 requires a greater amount of catalyst, while an area velocity exceeding 50 causes the decomposition rate to be lowered, thereby failing to achieve the desired decomposition rate. It is here noted that the area velocity refers to a value obtained by dividing the amount of reactant gas ($Nm^3/u$, u:Hr) by the gas-catalyst contacting area per catalyst unit volume ($m^2/m^3$).

EXAMPLES

The following description will discuss, in more detail, examples of the present invention. It is noted that the present invention should not be limited to the following examples.

EXAMPLE 1

Kibushi clay was dried for 18 hours at 100° C., and then was crushed by a sample mill whose screen has holes of 0.5 mm diameter. 20 kg of the crushed products was mixed with 1 kg of methyl cellulose type binder (Yuken Industry Co., YB-32) and water. The mixture was kneaded thoroughly by a kneader. After that, the mixture was put into an auger screw type extruder to which a honeycomb extruding die was attached, so that a honeycomb was obtained. In such a case, the water content was adjusted so as to have 30 to 35 kg/cm² of pressure. The obtained honeycomb was air-dried at ordinary temperature, and it was heated up to 500° C. at the rate of 5° C. per hour. After it was kept at 500° C. for 3 hours, it was cooled down at a rate of 10° C. by a hour. Thus, a honeycomb type carrier, having open area proportion of 64% and a pitch of 4.0 mm, was obtained.

704 g of $MnO_2$ having a specific surface area of 48 m²/g was added to 1034 ml of a titania sol ($TiO_2$ content: 150 g/l). To the mixture, 250 g of glass beads were added. The resultant mixture was agitated and mixed for 30 minutes. The glass bead was apart from the mixture to produce a slurry. After the slurry was diluted with 300 ml of water, a honeycomb type carrier, cut off at a suitable length, was dipped in the slurry. The excess slurry was removed from the honeycomb, and the coated honeycomb was dried and calcined for 3 hours at 500° C. Thus, there was prepared a support carrying a binary catalyst 10 μm in average thickness of a $MnO_2$-$TiO_2$ layer (weight ratio of 82:18). The thickness of the $MnO_2$-$TiO_2$ layer was measured by XPS. The open area proportion of the catalyst was 63% and the gas-catalyst contacting area per unit volume (hereinafter referred to as AP) was 795 m²/m³. The content of the catalytic active substance was 0.011 g/cc of the catalyst.

EXAMPLE 2

There was prepared a binary-catalyst having an open area proportion of 60% and an Ap of 775 m$^2$/m$^3$, in the same manner as that of Example 1, except that the MnO$_2$-TiO$_2$ layer was carried at 50 μm in average thickness. The content of the catalytic active substance was 0.056 g/cc of the catalyst.

EXAMPLE 3

There was prepared a binary-catalyst having open area proportion of 56% and an Ap of 750 m$^2$/m$^3$, in the same manner as that of Example 1, except that a MnO$_2$-TiO$_2$ sol slurry was not diluted with water and the MnO$_2$-TiO$_2$ layer was carried at 100 μm in average thickness. The content of the catalytic active substance was 0.108 g/cc of the catalyst.

EXAMPLE 4

There was prepared a binary-catalyst having open area proportion of 49% and an Ap of 700 m$^2$/m$^3$, in the same manner as that of Example 1, except that a MnO$_2$-TiO$_2$ sol slurry was not diluted with water and a MnO$_2$-TiO$_2$ layer was carried at 200 μm in average thickness. The content of the catalytic active substance was 0.201 g/cc of the catalyst.

EXAMPLE 5

There was prepared a ternary-catalyst carrying 10 μm in average thickness of a MnO$_2$-Ag$_2$O-TiO$_2$ layer (74:16:10) in the same manner as that of Example 1, except that 704 g of MnO$_2$ having a specific surface area of 48 m$^2$/g and 1034 ml of titania sol (TiO$_2$ content: 150 g/l) were mixed with 1000 ml of AgNo$_3$ aqueous solution (Ag$_2$O content: 100 g/l) in Example 5. The content of the catalytic active substance was 0.012 g/cc of the catalyst.

COMPARATIVE EXAMPLE 1

There was prepared a binary-catalyst having open area proportion of 64% and an Ap of 798 m$^2$/m$^3$, in the same manner as that of Example 1, except that the MnO$_2$-TiO$_2$ layer was carried at 5 μm in average thickness. The content of the catalytic active substance was 0.006 g/cc of the catalyst.

COMPARATIVE EXAMPLE 2

There was prepared a binary-catalyst having open area proportion of 46% and an Ap of 675 m$^2$/m$^3$, in the same manner as that of Example 1, except that a MnO$_2$-TiO$_2$ sol slurry was not diluted with water and the MnO$_2$-TiO$_2$ layer was carried at 250 μm in average thickness. The content of the catalytic active substance was 0.242 g/cc of the catalyst.

COMPARATIVE EXAMPLE 3

20 kg of MnO$_2$ having a specific surface area of 48 m$^2$/g was added to 29.27 l of a titania sol (150 g/l). The resultant mixture was thoroughly kneaded, and dried and calcined for 3 hours at 500° C. After cooling, the mixture was crushed by a sample mill, whose screen has 0.5 mm diameter holes, to obtain the calcined powder of MnO$_2$-TiO$_2$ (weight ratio of 82:18). 20 kg of the results was mixed with 1 kg of methyl cellulose type binder (Yuken Industry Co., YB-32) and water. The mixture was kneaded thoroughly by a kneader. After that, the mixture was put into an auger screw type extruder to which a honeycomb extruding die is attached, so that a honeycomb type catalyst was obtained. In such a case, the water content was adjusted so as to have 30 to 35 kg/cm$^2$ of pressure. The obtained honeycomb type catalyst was air-dried at ordinary temperature, and it was heated up to 500° C. at a rate of 5° C. by a hour. After it was kept at 500° C. for 3 hours, it was cooled down at the rate of 10° C. per hour. Thus, a binary-catalyst having open area proportion of 63% and an Ap of 795 m$^2$/m$^3$ was obtained. The content of the catalytic active substance was 0.63 g/cc of the catalyst.

COMPARATIVE EXAMPLE 4

There was prepared a binary-catalyst having open area proportion of 63% and an Ap of 795 m$^2$/m$^3$, in the same manner as that of Example 3, except that 6 kg of Kibushi clay was added to the mixture for extruding catalyst moldings as in Comparative Example 3. The content of the catalytic active substance was 0.58 g/cc of the catalyst.

Catalyst Activity Test

Figure 2:
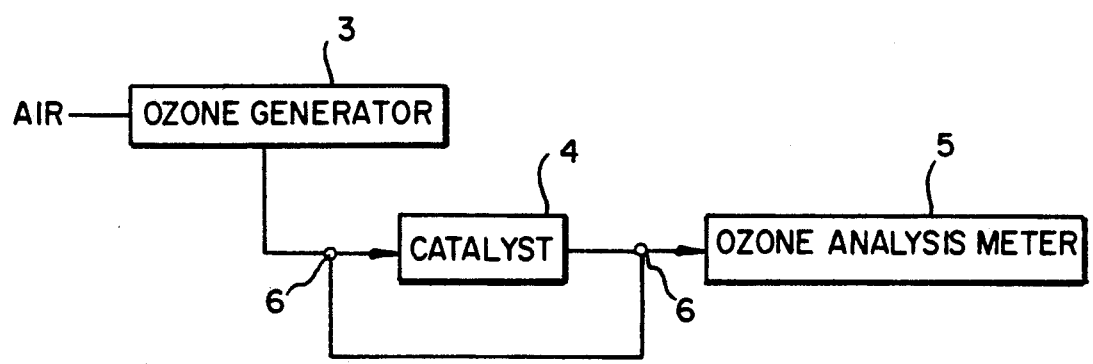
FIG. 2 is a flowsheet of a catalyst activity test.

Each catalyst of Examples 1 to 5 and Comparative Examples 1 to 4 was submitted to a catalyst activity test with the use of the test method having a flowsheet as shown in FIG. 2, under test conditions discussed later. In FIG. 2, an ozone generator is indicated at 3. The ozone generator 3 generates ozone at a suitable temperature by means of the air introduced thereinto. The air containing ozone is led to a catalyst 4. The ozone decomposition rate can be found by comparing the values of the inlet and outlet of the catalyst obtained by an ozone analysis 5 in accordance with the following formula. A three way cock is indicated at 6.

$$\text{Ozone decomposition rate (\%)} = \frac{\text{inlet ozone concentration} - \text{outlet ozone concentration}}{\text{inlet ozone concentration}} \times 100$$

Test Conditions
Space velocity: 20,000/Hr
Reaction temperature: 20° C.
The test results are shown in Table 1.

TABLE 1

|  | Catalytic active substance | Coating rate (μm) | Catalytic active substance per unit volume (g/cc) | Ozone decomposition rate (%) |
| --- | --- | --- | --- | --- |
| Example 1 | MnO$_2$/TiO$_2$ = 82/18 | 10 | 0.011 | 96.2 |
| Example 2 | MnO$_2$/TiO$_2$ = 82/18 | 50 | 0.056 | 97.9 |
| Example 3 | MnO$_2$/TiO$_2$ = 82/18 | 100 | 0.108 | 96.7 |
| Example 4 | MnO$_2$/TiO$_2$ = 82/18 | 200 | 0.201 | 96.0 |
| Example 5 | MnO$_2$/Ag$_2$O/TiO$_2$ = 74/10/16 | 10 | 0.012 | 100.0 |
| Comparative | MnO$_2$/TiO$_2$ = 82/18 | 5 | 0.006 | 86.4 |

TABLE 1-continued

|   | Catalytic active substance | Coating rate (μm) | Catalytic active substance per unit volume (g/cc) | Ozone decomposition rate (%) |
| --- | --- | --- | --- | --- |
| Example 1 Comparative Example 2 | $MnO_2/TiO_2 = 82/18$ | 250 | 0.242 | 82.7 |
| Comparative Example 3 | $MnO_2/TiO_2 = 82/18$ | — | 0.632 | 94.5 |
| Comparative Example 4 | $MnO_2/TiO_2/clay = 63/14/23$ | — | 0.581 | 88.8 |

As is apparent from Table 1, the use of any of the catalysts obtained in Examples 1 to 5 results in a higher ozone decomposition rate (%) than the catalysts obtained in Comparative Examples 1, 2 and 4. Thus, it is found that the catalyst of the present invention presents high ozone decomposition performance irrespective of the amount of catalytic active substance per unit volume.

EXAMPLE 6

Gairome clay was dried for 18 hours at 100° C., and then was crushed by a sample mill whose screen has holes of 0.5 mm diameter. 8 kg of the crushed products and 2 kg of active carbon were mixed with 0.8 kg of methyl cellulose type binder (Yuken Industry Co., YB-32) and water. The mixture was kneaded thoroughly by a kneader. After that, the mixture was put into an auger screw type extruder to which a honeycomb extruding die is attached, so that a honeycomb was obtained. The obtained honeycomb was air-dried at ordinary temperature, and it was heated up to 500° C. at the rate of 5° C. per hour in $N_2$ current. After it was kept at 500° C. for 3 hours, it was cooled down at the rate of 10° C. per hour. Thus, a honeycomb type carrier having open area proportion of 64% and a pitch of 1.0 mm was obtained. On the other hand, 1 kg of $MnO_2$ having a specific surface area of 67 m²/g was added to 500 ml of water and a small amount of binder. To the mixture, 250 g of glass bead was added. The resultant mixture was agitated and mixed for 30 minutes. The glass bead was separated from the mixture to produce a slurry. After the slurry was diluted with 300 ml of water, the honeycomb type carrier, cut off at a suitable dimension was dipped in the slurry. The excess slurry was separated from the honeycomb type carrier, and the honeycomb type carrier was dried. Thus, there was prepared a catalyst carrying 31 μm in average thickness of $MnO_2$. The thickness of the carried $MnO_2$ layer was calculated by obtaining its average value according to EPMA linear analysis on the assumption that the number of n is 10. The thickness was obtained by the same method in the following Examples and Reference Example.

EXAMPLE 7

There was prepared a catalyst carrying $MnO_2$-$TiO_2$ (weight ratio of 80:20) in the same manner as that of Example 6, except that 800 g of $MnO_2$, 200 g of $TiO_2$ and 500 ml of diluting water were used in Example 7, instead of 1 kg of $MnO_2$ and 300 ml of diluting water used in Example 6. Thus, there were obtained five kinds of catalysts having coating thicknesses of 4 μm, 8 μm, 13 μm, 25 μm and 38 μm by adjusting the number of coatings.

EXAMPLE 8

There was prepared a catalyst carrying an average thickness of 43 μm of $MnO_2$-$Ag_2O$ (weight ratio of 90:10) in the same manner as that of Example 6, except that 900 g of $MnO_2$ and 100 g of $Ag_2O$ were used in Example 8, instead of 1 kg of $MnO_2$ used in Example 6.

EXAMPLE 9

There was prepared a honeycomb type carrier in the same manner as that of Example 6, except that 5 kg of the crushed Gairome clay, 5 kg of active carbon and 1 kg of methyl cellulose type binder (Yuken Industry Co., YB-32) were used in Example 9. The carrier was treated by the same slurry as used in Example 7. Thus, there were prepared five kinds of catalysts having the coating thicknesses of 5 μm, 10 μm, 18 μm, 29 μm and 43 μm by adjusting the number of coatings.

EXAMPLE 10

There was prepared a catalyst carrying 50 μm in average thickness of $MnO_2$-$Fe_2O_3$-$Ag_2O$ (weight ratio of 50:40:10) in the same manner as that of Example 6, except that 400 g of $Fe_2O_3$ having a specific surface area of 38 m²/g, 100 g of $Ag_2O$ and 500 g of $MnO_2$ were used in Example 10, instead of 1 kg of $MnO_2$ used in Example 6.

EXAMPLE 11

There was prepared a catalyst carrying 38 μm in average thickness of $MnO_2$-active carbon-$TiO_2$ (weight ratio of 70:20:10) in the same manner as that of Example 6, except that 200 g of active carbon (Takeda Pharmaceutical Co., "Shirasagi A"), 100 g of $TiO_2$ and 700 g of $MnO_2$ were used, instead of 1 kg of $MnO_2$ used in Example 6.

EXAMPLE 12

There was prepared a catalyst carrying 49 μm in average thickness of CuO in the same manner as that of Example 6, except that CuO having a specific surface area of 55 m²/g was used, instead of $MnO_2$ used in Example 6.

EXAMPLE 13

There was prepared a catalyst carrying 57 μm in average thickness of $MnO_2$ in the same manner as that of Example 9, except that 18 kg of Gairome clay and 2 kg of active carbon were used when extruding and molding a carrier.

REFERENCE EXAMPLE 30 g of $MnO_2$ having a specific surface area of 48 m²/g and 70 g of a mixture of titanium tetrachloride with a silica sol ($TiO_2$:$SiO_2$=1:1) were agitated and mixed. While agitating and mixing, ammonia gas was blown these into such that the resultant mixture was neutralized, thereby to produce a slurry like precipitate. After being sufficiently washed with water, the precipitate was then calcined for 3 hours at 500° C. and milled. Thus, there was prepared a powder of a ternary-catalyst $MnO_2$-$TiO_2$-$SiO_2$ (weight ratio of 35:30:35) having a specific surface area of 162 $m^2/g$. There was prepared a ternary-catalyst carrying $SiO_2$-$MnO_2$-$TiO_2$ (weight ratio of 35:30:35) with a carry rate of 99% by using the powder in the same manner as that of Example 6.

Catalyst Activity Test

Each catalyst of Examples 6 to 13 and Reference Example was submitted to a catalyst activity test in the same manner as in Examples 1 to 5. There were obtained ozone decomposition rates initially, after 10 hours and after 100 hours. The test conditions are as follows.

Test Conditions
Space velocity: 20,000/Hr
Inlet ozone concentration: 10 ppm
Reaction temperature: 20° C.
The test results are shown in Table 2.

glass bead was added. The resultant mixture was agitated and mixed for 30 minutes. The glass bead was separated from the mixture to produce a slurry. After the slurry was diluted with 300 ml of water, the honeycomb type carrier, cut off at a suitable dimension was dipped into the slurry. The excess slurry was separated from the carrier, and the carrier was dried. Thus, there was prepared a catalyst carrying 38 μm in average thickness of $MnO_2$. The thickness of the carried $MnO_2$ layer was calculated by obtaining its average value according to EPMA linear analysis on the assumption that the number of n is 10. The thickness was obtained by the same method in the following Examples and Reference Example.

EXAMPLE 15

There was prepared a catalyst carrying $MnO_2$-$TiO_2$ (weight ratio of 80:20) in the same manner as that of Example 14, except that 800 g of $MnO_2$, 200 g of $TiO_2$ and 500 ml of diluting water were used, instead of 1 kg

TABLE 2

| | Catalyst | | Coating thickness (μm) | Ozone decomposition rate (%) | | |
|---|---|---|---|---|---|---|
| | Coating layer | Carrier | | Initial | After 10 hours | After 100 hours |
| Example 6 | $MnO_2$ | Active carbon/clay = 20/80 | 36 | 99.7 | 99.6 | 96.7 |
| Example 7 | $MnO_2$/$TiO_2$ | Active carbon/clay = 20/80 | 4 | 87.3 | 85.4 | 80.5 |
| | | | 8 | 99.1 | 97.3 | 93.2 |
| | | | 13 | 99.5 | 99.3 | 98.0 |
| | | | 25 | 99.8 | 99.7 | 98.6 |
| | | | 38 | 99.8 | 99.8 | 98.9 |
| Example 8 | $MnO_2$/$Ag_2O$ | Active carbon/clay = 20/80 | 43 | 99.8 | 99.8 | 99.2 |
| Example 9 | $MnO_2$/$TiO_2$ | Active carbon/clay = 50/50 | 5 | 91.2 | 90.3 | 85.6 |
| | | | 10 | 99.6 | 99.6 | 95.3 |
| | | | 18 | 99.8 | 99.8 | 98.8 |
| | | | 29 | 99.9 | 99.9 | 99.3 |
| | | | 43 | 99.9 | 99.9 | 99.5 |
| Example 10 | $MnO_2$/$Fe_2O_3$/$Ag_2O$ | Active carbon/clay = 20/80 | 50 | 99.7 | 90.5 | 81.1 |
| Example 11 | $MnO_2$/active carbon/$TiO_2$ | Active carbon/clay = 20/80 | 38 | 99.9 | 99.9 | 99.5 |
| Example 12 | CuO | Active carbon/clay = 20/80 | 49 | 89.2 | 86.1 | 70.2 |
| Example 13 | $MnO_2$ | Active carbon/clay = 10/90 | 57 | 96.3 | 94.3 | 86.3 |
| Reference Example | $MnO_2$/$TiO_2$/$SiO_2$ | — | | 86.8 | 72.1 | 55.6 |

EXAMPLE 14

Kibushi clay was dried for 18 hours at 100° C., and then was crushed by a sample mill whose screen has holes of 0.5 mm diameter. 8 kg of the crushed products and $MnO_2$ having a specific area of 67 $m^2/g$ were mixed with 0.8 kg of methyl cellulose type binder (Yuken Industry Co., YB-32) and water. The mixture was kneaded thoroughly by a kneader. After that, the mixture was put into an auger screw type extruder to which a honeycomb extruding die is attached, so that a honeycomb was obtained. The obtained honeycomb was air-dried at ordinary temperature, and it was heated up to 500° C. at the rate of 5° C. per hour in $N_2$ current. After it was kept at 500° C. for 3 hours, it was cooled down at the rate of 10° C. per hour. Thus, the honeycomb type carrier having open area proportion of 64% and a pitch of 1.0 mm was obtained. 1 kg of $MnO_2$ having a specific surface area of 67 $m^2/g$ was added to 500 ml of water and a small amount of binder. To the mixture, 250 g of of $MnO_2$ and 300 ml of diluting water used in Example 14. Thus, there were obtained five kinds of catalysts having coating thicknesses of 6 μm, 10 μm, 15 μm, 30 μm, and 42 μm by adjusting the number of coatings.

EXAMPLE 16

There was prepared a catalyst carrying in average thickness of 47 μm of $MnO_2$-$Ag_2O$ (weight ratio of 90:10) in the same manner as that of Example 14, except that 900 g of $MnO_2$ and 100 g of $Ag_2O$ were used, instead of 1 kg of $MnO_2$ used in Example 14.

EXAMPLE 17

There was prepared a honeycomb type carrier in the same manner as that of Example 14, except that 5 kg of the crushed Kibushi clay, 5 kg of $MnO_2$, 1 kg of methyl cellulose type binder (Yuken Industry Co., YB-32) were used. The carrier was treated by the same slurry as used in Example 15. Thus, there were prepared five kinds of catalysts having the coating thicknesses of 5 μm, 11 μm, 20 μm, 33 μm and 45 μm by adjusting the number of coatings.

Catalyst Activity Test

Each catalyst of Examples 14 to 21 was submitted to a catalyst activity test in the same manner as in Examples 6 to 13. The test results are shown in Table 3.

TABLE 3

| | Catalyst | | Coating thickness | Ozone decomposition rate (%) | | |
|---|---|---|---|---|---|---|
| | Coating layer | Carrier | (μm) | Initial | After 10 hours | After 100 hours |
| Example 14 | $MnO_2$ | $MnO_2$/clay = 20/80 | 38 | 99.7 | 99.5 | 97.1 |
| Example 15 | $MnO_2/TiO_2$ | $MnO_2$/clay = 20/80 | 6 | 85.9 | 81.6 | 73.1 |
| | | | 10 | 98.9 | 96.2 | 90.5 |
| | | | 15 | 99.5 | 99.3 | 97.7 |
| | | | 30 | 99.8 | 99.7 | 98.5 |
| | | | 42 | 99.8 | 99.8 | 98.9 |
| Example 16 | $MnO_2/Ag_2O$ | $MnO_2$/clay = 20/80 | 47 | 99.8 | 99.8 | 99.2 |
| Example 17 | $MnO_2$ | $MnO_2$/clay = 50/50 | 5 | 89.9 | 86.8 | 81.7 |
| | | | 11 | 99.4 | 99.3 | 94.8 |
| | | | 20 | 99.8 | 99.8 | 98.8 |
| | | | 33 | 99.9 | 99.9 | 99.3 |
| | | | 45 | 99.9 | 99.9 | 99.5 |
| Example 18 | $MnO_2/Fe_2O_3$ | $MnO_2$/clay = 20/80 | 51 | 99.6 | 90.6 | 79.2 |
| Example 19 | $MnO_2/Fe_2O_3$ | $MnO_2$/clay = 20/80 | 38 | 99.9 | 99.9 | 99.5 |
| Example 20 | CuO | $MnO_2$/clay = 20/80 | 45 | 86.2 | 82.0 | 69.2 |
| Example 21 | $MnO_2$ | $MnO_2$/clay = 10/90 | 57 | 94.8 | 93.1 | 84.7 |

EXAMPLE 18

There was prepared a catalyst carrying 51 μm in average thickness of $MnO_2$-$Fe_2O_3$-$Ag_2O$ (weight ratio of 50:40:10) in the same manner as that of Example 14, except that 400 g of $Fe_2O_3$ having a specific surface area of 38 m$^2$/g, 100 g of $Ag_2O$ and 500 g of $MnO_2$ were used, instead of 1 kg of $MnO_2$ used in Example 14.

EXAMPLE 19

There was prepared a catalyst carrying 38 μm in average thickness of $MnO_2$-active carbon-$TiO_2$ (weight ratio of 70:20:10) in the same manner as that of Example 14, except that 200 g of active carbon (Takeda Pharmaceutical Co., "Shirasagi A"), 100 g of $TiO_2$ and 700 g of $MnO_2$ were used, instead of 1 kg of $MnO_2$ used in Example 14.

EXAMPLE 20

There was prepared a catalyst carrying 45 μm in average thickness of CuO in the same manner as that of Example 14, except that CuO having a specific surface area of 55 m$^2$/g was used, instead of $MnO_2$ used in Example 14.

EXAMPLE 21

There was prepared a catalyst carrying 57 μm in average thickness of $MnO_2$ in the same manner as that of Example 17, except that 18 kg of Kibushi clay and 2 kg of active carbon were used when extruding and molding a carrier in Example 17.

As apparent from Tables 2 and 3, any of the catalysts obtained in Examples 6 to 21 causes a high ozone decomposition rate and has good durability for a long time.

What is claimed is:

1. In a catalyst assembly for the removal of ozone from a gas containing such comprising a carrier member, which comprises a carrier material, and a catalyst for the decomposition of ozone coated on said carrier member:
   the improvement, whereby reducing the thickness of said catalyst coating on said carrier to about 5 to 100 micrometers, and improving the ozone removal from said gas, which comprises said carrier member having been formed by mixing said carrier material with a substance which is active for the decomposition or absorption of ozone, and then forming said mixture into said carrier assembly and in addition, said assembly having said ozone decomposition catalyst coated thereon.

2. A catalyst as claimed in claim 1 wherein said carrier assembly is in the form of a honeycomb containing an ozone decomposition catalyst therein.

3. A catalyst for decomposing ozone according to claim 1, wherein the thickness of said catalyst coating is 10 to 50 micrometers.

4. A catalyst for decomposing ozone according to claim 1, wherein said substance is contained in said carrier in a proportion of 10% by weight or more.

* * * * *